United States Patent [19]

DiVincenzo

[11] 4,211,447
[45] Jul. 8, 1980

[54] CAR FLOOR TRAY

[76] Inventor: Joseph DiVincenzo, 110 Burke Dr., Buffalo, N.Y. 14215

[21] Appl. No.: 940,322

[22] Filed: Sep. 7, 1978

[51] Int. Cl.² .................................................. B62D 25/20
[52] U.S. Cl. ..................................... 296/1 F; 180/90.6
[58] Field of Search ................. 296/1 F, 1 R; 15/215, 15/216, 217; 206/557; 211/34; 220/1 C, DIG. 6; D12/203; 180/90.6

[56] References Cited

U.S. PATENT DOCUMENTS

| | | | |
|---|---|---|---|
| 2,897,963 | 8/1959 | Byers, Jr. | 206/557 |
| 3,050,329 | 8/1962 | Pagan | 296/1 F |
| 3,312,497 | 4/1967 | Stata | 296/1 F |
| 3,424,265 | 1/1969 | Stata | 296/1 F |
| 3,605,166 | 9/1971 | Chen | 15/215 |

Primary Examiner—Robert R. Song
Attorney, Agent, or Firm—Joseph P. Gastel

[57] ABSTRACT

A car floor tray including a perforated floor portion for receiving the footwear of a vehicle occupant, a tray portion underlying the perforated floor portion for receiving liquid which drains through the floor portion, a compartment in communication with the tray for receiving absorbent material for absorbing liquid which drains into the compartment from the tray, and selectively replaceable absorbent material in the compartment.

14 Claims, 4 Drawing Figures

U.S. Patent  Jul. 8, 1980  4,211,447
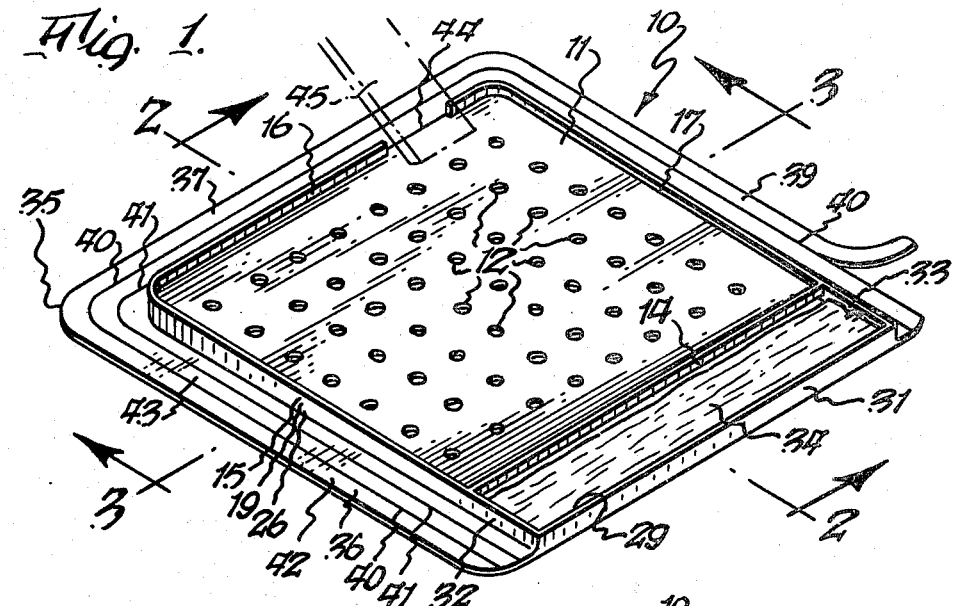
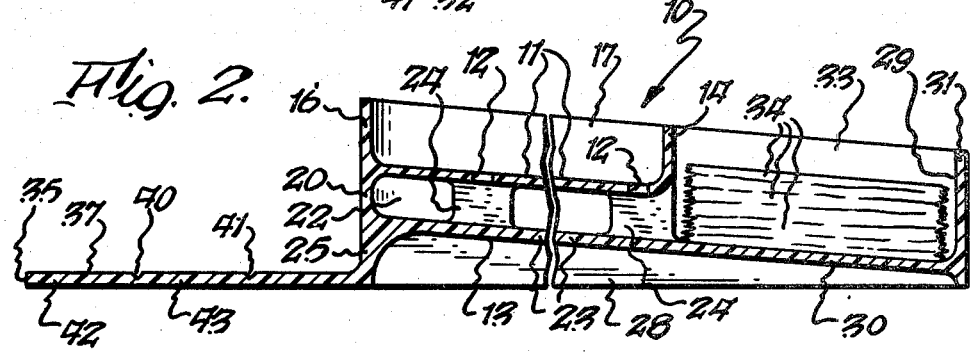
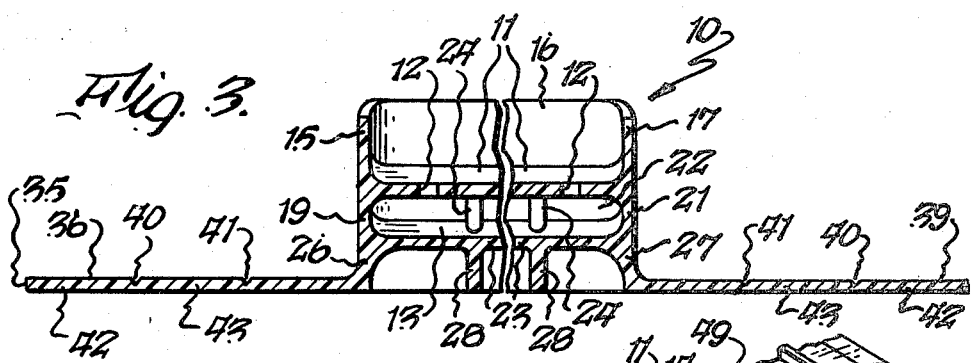
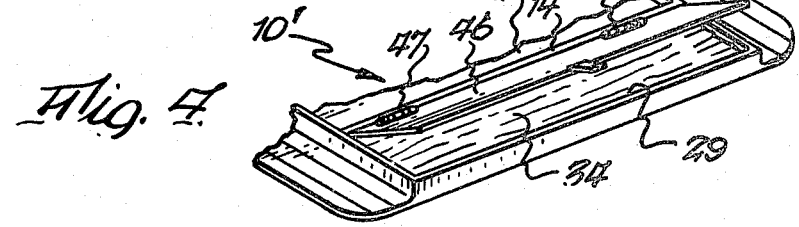

CAR FLOOR TRAY

BACKGROUND OF THE INVENTION

The present invention relates to an improved car floor tray of the type which is used under the feet of vehicle occupants.

By way of background, the melting of snow from the footwear of a vehicle occupant onto the floor of a car has produced problems in the past. In this respect, the snow would melt into puddles into which the occupant's pant cuffs would dip and therefore become soiled. In addition, the water could refreeze to produce a slippery surface which could result in injury to the vehicle occupant. Furthermore, the melted water, which usually contains salt, could pass through the carpeting and corrode the metal floor of the vehicle. It is with the overcoming of the foregoing problem in a highly efficient and practical manner that the present invention is concerned.

SUMMARY OF THE INVENTION

It is accordingly one object of the present invention to provide an improved car floor tray which can be used to efficiently dispose of water produced by the melting of snow and ice from the footwear of a vehicle occupant. Other objects and attendant advantages of the present invention will readily be perceived hereafter.

The present invention relates to a car floor tray comprising a floor portion for receiving the footwear of a vehicle occupant, opening means in said floor portion for permitting liquid to pass downwardly through said floor portion, a tray portion including a bottom underlying said floor portion for receiving liquid which drains through said opening means in said floor portion, a compartment in communication with said tray portion for receiving material for absorbing liquid from said tray portion, and selectively replaceable absorbent material in said compartment.

The various aspects of the present invention will be more fully understood when the following portions of the specification are read in conjunction with the accompanying drawings wherein:

BRIEF DESCRIPTION OF THE DRAWINGS

FIG. 1 is a perspective view of the improved car floor tray of the present invention;

FIG. 2 is a fragmentary cross sectional view taken substantially along line 2—2 of FIG. 1;

FIG. 3 is a fragmentary cross sectional view taken substantially along line 3—3 of FIG. 1; and FIG. 4 is a fragmentary perspective view of a modified form of the present invention.

DESCRIPTION OF THE PREFERRED EMBODIMENTS

The improved car floor tray 10 of the present invention is preferably fabricated from plastic material and includes a floor portion 11 for receiving the footwear of a vehicle occupant when tray 10 is placed on the floor of a vehicle. Floor 11 includes perforations 12 which permit liquid which drains from the footwear of the vehicle occupant to pass downwardly into tray portion 13 which underlies floor 11. Floor 11 is bordered by upstanding upper wall portions 14, 15, 16 and 17 which form a rim to confine liquid to the area enclosed thereby.

Upper wall portions 15, 16 and 17 are essentially continuations of lower wall portions 19, 20 and 21, respectively, which form three sides of chamber 22 which is defined by these lower wall portions and floor 11 and the bottom 23 of tray 13. A plurality of spacers 24 space floor 11 from bottom 23. Lower wall portion 20 merges into leg portion 25 (FIG. 2) which supports the end of tray 10 closest to the engine compartment of the vehicle. Lower wall portions 19 and 21 extend into legs 26 and 27, respectively, (FIG. 3), which are mirror image counterparts of each other, and which taper downwardly away from leg portion 25 so as to cause tray floor 11 and bottom 23 to be inclined downwardly away from the front of the vehicle. Thus, liquid which falls onto floor 11 and passes through apertures 12 into chamber 22 will flow along bottom 23, toward the right in FIG. 2. Intermediate legs 28, which may be similar in shape to legs 26 and 27 may extend downwardly from bottom 23 to provide support thereto.

A compartment 29 is provided for receiving water which flows along bottom 23. Compartment 29 is defined by bottom wall 30, which is a continuation of tray bottom 23, and by upstanding sides 31, 32 and 33, the latter two sides being horizontal extensions of wall portions 15:19 and 17:21, respectively. Thus, water draining downwardly along tray bottom 23 will enter compartment 29. A plurality of removable absorbent pads 34 are placed in compartment 29 to absorb the water draining into said compartment. After the pads 34 are saturated, they can be removed and replaced by other pads. Pads 34 may be strips of newspaper, paper towels, or any other type of absorbent material.

It will be appreciated that by the use of pads 34, there will be no pool of water on the floor of the vehicle or in the tray 10 so that pant cuffs which touch the floor 11 will not be soiled. In addition, it is to be noted that compartment 29 is sufficiently rearwardly of the feet of the vehicle occupant so that normally the rear of the pant cuffs of such occupants will not overlie compartment 29.

A continuous U-shaped flange 35 consisting of side portions 36, 37 and 39 are formed integrally with parts 26, 25 and 27, respectively, as shown in FIGS. 2 and 3. Flange 35 lies on the vehicle floor and provides a mat which covers a portion of the vehicle floor beyond the tray portions described above. Continuous score lines 40 and 41 are provided in flange 35 to permit U-shaped strips 42 and 43 to be severed from flange 35 so as to custom-fit the tray to the floor of a vehicle.

It is also to be noted that there is a discontinuity 44 in rim portion 16 to permit unrestricted movement of accelerator pedal 45, the lower portion of which overlies tray 10 in this area.

A modified embodiment of the present invention is shown in FIG. 4. Tray 10' may be identical in all respects to tray 10 of FIG. 1 except that a cover 46 is provided for compartment 29. Cover 46 has hinges 47 and 49 which hinge it to wall or rim portion 14. Thus, cover 46 remains closed during use so that absorbent material 34 is not visible. As can be seen, whenever it is desired to remove absorbent material 34, it is merely necessary to open cover 46, which is closed after the supply of absorbent material 34 is replenished in compartment 29.

While the improved tray of the present invention has been disclosed as being fabricated from plastic, it will be appreciated that it can also be fabricated from rubber, metal, or any other suitable material.

It can thus be seen that the improved car floor tray of the present invention is manifestly capable of achieving the above-enumerated objects and while preferred embodiments of the present invention have been disclosed, it will be appreciated that the present invention is not limited thereto but may be otherwise embodied within the scope of the following claims.

What is claimed is:

1. A car floor tray comprising a floor portion for receiving the footwear of a vehicle occupant, opening means in said floor portion for permitting liquid to pass downwardly through said floor portion, a tray portion including a bottom underlying said floor portion for receiving liquid which drains through said openings in said floor portion, a compartment in communication with said tray portion for receiving absorbent material for absorbing liquid from said tray portion, and selectively replaceable absorbent material in said compartment.

2. A car floor tray as set forth in claim 1 wherein said opening means comprise perforations in said floor portion.

3. A car floor tray as set forth in claim 1 including inclining means for inclining said tray portion downwardly away from the front of the car to cause liquid to flow into said compartment.

4. A car floor tray as set forth in claim 3 wherein said perforated floor portion and said bottom are substantially parallel, and wherein said inclining means comprises leg means for supporting said tray on the floor of a car.

5. A car floor tray as set forth in claim 4 wherein said leg means comprise tapered members extending from front to rear below said bottom.

6. A car floor tray as set forth in claim 2 including a selectively openable cover for said compartment.

7. A car floor tray as set forth in claim 1 including a flange of planar material extending about a plurality of sides of said floor tray.

8. A car floor tray as set forth in claim 7 including scoring in said flange for permitting strips thereof to be removed therefrom.

9. A car floor tray as set forth in claim 2 including an upstanding rim on said floor portion to confine liquid onto said floor portion.

10. A car floor tray as set forth in claim 9 including discontinuity means in said rim to permit an accelerator pedal to extend over said floor portion.

11. A car floor tray comprising a floor portion for receiving the footwear of a vehicle occupant, opening means in said floor portion for permitting liquid to pass downwardly through said floor portion, a tray portion including a bottom underlying said floor portion for receiving liquid which drains through said openings in said floor portion, and compartment means in communication with said tray portion for receiving material for absorbing liquid from said tray portion.

12. A car floor tray as set forth in claim 11 including a selectively openable cover for said compartment means.

13. A car floor tray as set forth in claim 11 including an upstanding rim on said floor portion to confine liquid onto said floor portion, and discontinuity means in said rim to permit an accelerator pedal to extend over said floor portion.

14. A car floor tray as set forth in claim 3 wherein said inclining means cause said tray to be inclined downwardly away from the front of the car.

* * * * *